United States Patent

[11] 3,620,586

| [72] | Inventor | Charles R. Maastricht |
| | | Fond du Lac, Wis. |
| [21] | Appl. No | 10,740 |
| [22] | Filed | Feb. 12, 1970 |
| [45] | Patented | Nov. 16, 1971 |
| [73] | Assignee | Giddings & Lewis, Inc. |
| | | Fond du Lac, Wis. |

[54] PRELOAD SPINDLE BEARING FOR MACHINE TOOL
8 Claims, 2 Drawing Figs.

[52] U.S. Cl. ............................................ 308/207 A
[51] Int. Cl. ......................................... F16c 35/06
[50] Field of Search ............................ 308/207 A, 207, 189, 189 A

[56] References Cited
UNITED STATES PATENTS
3,211,060  10/1965  McCann .......... 308/207

FOREIGN PATENTS
1,859,858  10/1962  Germany ..............

Primary Examiner—Martin P. Schwadron
Assistant Examiner—Frank Susko
Attorney—Wolfe, Hubbard, Voit and Osann ABSTRACT: A spindle mounting for a machine tool adapted to apply a predetermined light preload to the spindle bearings during high-speed operation and a predetermined higher preload during low-speed operation. The preload mechanism includes a pair of axially aligned hydraulically actuated pistons disposed on opposite sides of one of the outer bearing races. The pistons have a relatively narrow annular shape and do not extend radially outward substantially beyond the bearing, thereby minimizing the headstock space required. The outer periphery of each spindle bearing is formed with annular grooves through which a cooling fluid may be circulated for more efficient cooling of the bearings. Such cooling grooves also permit the bearings to be directly mounted in the headstock housing without containment in an intermediate cooling sleeve, thereby providing more accurate spindle support.

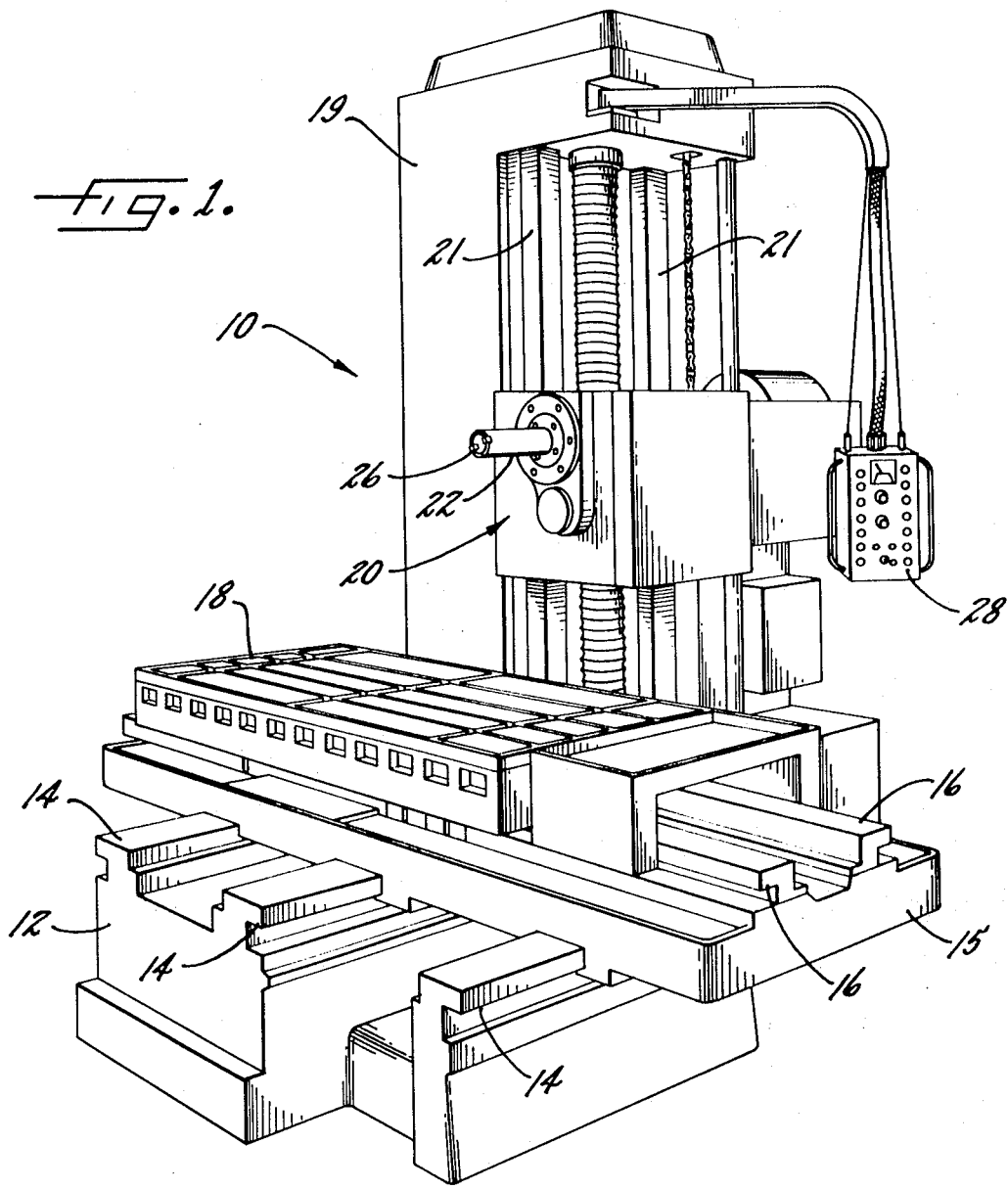

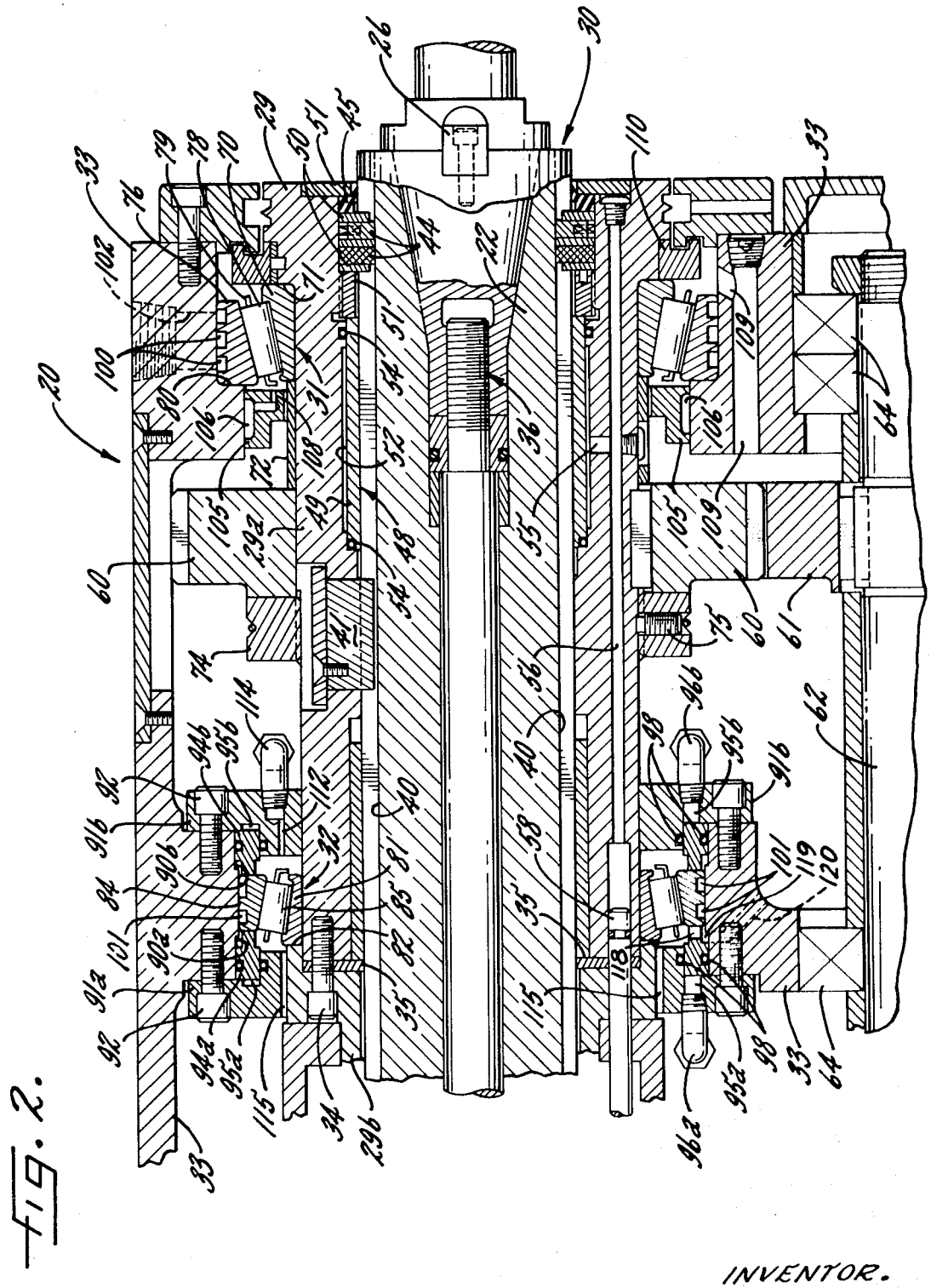

PRELOAD SPINDLE BEARING FOR MACHINE TOOL

The present invention relates generally to machine tools and more particularly concerns mechanisms for variably preloading the bearings journaling machine tool spindles.

In the past, various attempts have been made to provide a variable preload mechanism for spindle bearings of a machine tool which allows adjustment of the preload to suit operating conditions. Some of these systems have been relatively complicated and have experienced difficulties and inaccuracies in their operation. Other mechanisms have required additional space about the spindle, thus increasing the overall size of the headstock. When headstock space is limited, the latter type mechanism has not been well suited for machines having an axially extensible, or "live," spindle which itself requires larger spindle bearings and additional headstock space.

It is a primary object of the present invention to provide an improved spindle mounting for a machine tool adapted to vary the spindle bearing preload between accurate high and low adjustments, while not requiring significantly greater headstock space than a conventional spindle-bearing assembly.

A related object is to provide a spindle mounting of the above kind that is simple and compact in construction and thus is well suited for a machine tool having a live spindle.

Another object is to provide a spindle mounting as characterized above which provides more accurate spindle support due to direct mounting of the bearings within the headstock and more efficient cooling of the bearings.

Other objects and advantages of the invention will become apparent upon reading the following detailed description and upon reference to the drawings in which:

FIG. 1 is a side elevation of a typical machine tool embodying the present invention;

FIG. 2 is an enlarged vertical section taken through the spindle in FIG. 1 illustrating in more detail the features of the present invention.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the invention is to cover all modifications, equivalents and alternatives falling within the spirit and scope of the invention.

Turning now to the drawings, there is shown in FIG. 1 an illustrative horizontal boring, drilling, and milling machine 10 which embodies the spindle mounting of the present invention. The machine 10 comprises a bed 12 having ways 14 on its top surface supporting a saddle 15 for longitudinal sliding movement thereon. The saddle, in turn, has crossways 16 supporting a worktable 18 for transverse sliding movement. A workpiece (not shown) may be mounted on the table 18 in a suitable manner.

An upstanding column 19 is fixed to one end of the machine base and carries a headstock 20 adapted to be vertically positioned along column ways 21. The headstock has a spindle 22 mounted therein which in the illustrated case may be rotatably and axially driven by suitable drive and feed motors, respectively. The projecting end of the spindle is provided with a coupling element 26 adapted to engage and support an appropriate cutting tool. The spindle happens in this instance to be coupled to the drive motor through a planetary gear transmission and may be operated over a wide range of speeds, for example, 30 r.p.m. to 2,400 r.p.m. Operation of the machine tool is controlled by a swinging pendant control 28.

As shown in detail in FIG. 2, the spindle 22 is disposed within a sleeve 29 and together they comprise a spindle assembly 30. The spindle assembly 30 is rotatably supported within the housing 33 of the headstock by front and rear antifriction bearings 31, 32, respectively. The illustrated spindle sleeve 29 is made up of two sections 29a, 29b secured together in axially abutting relation by capscrews 34, with a spacer 35 being interposed between the two abutting sections 29a, 29b. A power drawbolt mechanism 36, not shown in detail, is provided within the spindle 22 for securing a tool.

To facilitate movement of the spindle relative to the spindle sleeve and rotational movement of the spindle with the sleeve, the spindle 22 is formed with longitudinal keyways 40. A key 41 fixed within the sleeve 29 is disposed in each of the keyways 40 to prevent relative rotational movement of the spindle and sleeve, while allowing the spindle to be fed axially by known means. To maintain the keyways 40 in a clear condition, a pair of wipers 44 are provided at the forward end of the spindle. The outer surface of the spindle is cleaned by an annular wiper 45.

In order to increase the rigidity of the spindle assembly after the spindle has been axially positioned, a hydraulic clamp 48 is provided between the sleeve 29 and spindle 22 for firmly engaging the spindle. The hydraulic clamp includes a sleeve 49 disposed within an internally counterbored section of the spindle sleeve 29 in closely surrounding relation to the outer surface of the spindle 22. The clamp sleeve 49, a spacer 50, and the wipers 44, 45 all are retained in abutting relation within the spindle sleeve by an end cap 51. A thin pressure chamber 52 is defined about the outer surface of the clamp sleeve 49 between a pair of O-ring seals 54. A radial port 55 and a longitudinal port 56 connect the pressure chamber 52 to a pressure source. When high pressure is applied to the pressure chamber 52, such as by movement of a plunger 58, the sleeve 49 tightly grips the spindle 22 and rigidly holds it in place. When the plunger 58 is retracted the pressure in the chamber is relieved permitting the spindle to be axially fed or retracted.

To rotatably drive the spindle assembly 30, a bull gear 60 is suitably secured to the spindle sleeve 29 so as to mesh with a drive gear 61 at the output side of the drive transmission. The drive gear 61 is keyed to a shaft 62 which is rotatably supported within the headstock housing on bearings 64.

The front and rear spindle bearings 31, 32 as shown in FIG. 2, in this instance are of the tapered roller bearing type adapted to resist both radial and axial loads on the spindle assembly 30. The front bearing 31 includes a conical inner race 70 mounted on the spindle sleeve 29 against a shoulder 71 formed in the spindle sleeve. The inner race 70, a spacer 72, and the bull gear 60 are all interposed in axial butting relation between the shoulder 71 and a lock ring 74 fixed to the spindle sleeve by a set screw 75. An outer race 76, also generally conical in shape, serves to locate a plurality of tapered rollers 78 in the front bearing. The outer race 76 is mounted in direct contact and bearing relation with the headstock housing 33 and in abutting engagement with a shoulder 80 formed in the housing. The rollers 78 are maintained in a circumferentially spaced condition between the two races by an appropriate cage 79. The rear bearing 32, similar to the front bearing 31, includes a conical inner race 81 mounted on the spindle sleeve against a shoulder 82. A rear outer bearing race 84 in this case is slidably mounted within the headstock, having its outer periphery positioned on a flat machined surface of the headstock housing 33. A plurality of rollers 85 separated by an appropriate cage similarly are interposed between the races 81, 84.

In accordance with the present invention, provision is made for preloading the bearings 31, 32 at high or low adjustments without significantly increasing the size of the headstock. To this end, a pair of annular cylinders 90a, 90b are formed in the housing 33 on opposite sides of the rear bearing outer race 84. The cylinders 90a, 90b in this case are defined by an outer wall of the headstock housing 33 and opposed annular plates 91a, 91b fixed to the housing by bolts 92. A pair of axially aligned pistons 94a, 94b are retained in the cylinders 90a, 90b, respectively, for abutting engagement with opposite side faces of the outer bearing race 84. In order that the pistons occupy only a minimum of space in the headstock 30, they have a relatively thin annular configuration and do not extend radially outward substantially beyond the outer bearing race.

Due to the conical configuration of the outer race 84, it will be apparent that axial movement of the pistons 94a, 94b to the left, as seen in FIG. 2, will act to increase the preload on the bearing 32. At the same time, the tendency for the spindle sleeve 29 to move to the left as a result of the inner bearing race 81 acting against the shoulder 82, increases the preload on the front bearing 31. On the other hand, movement of the pistons 94a, 94b in the opposite direction will decrease the preload on the bearings 31, 32.

In order to move the pistons 94a, 94b to change the preload on the bearings, pressure chambers 95a, 95b, respectively, are formed adjacent the outwardly extending ends of the pistons and hydraulic pressure supply passages 96a, 96b, are provided to supply pressure fluid to the chambers 95a, 95b. Thus, when the pressure chamber 95b is supplied, by known means, with a pressure medium such as hydraulic fluid the piston 94b urges the outer bearing race 84 and piston 94a to the left, as seen in FIG. 2, to increase the preload on the rear bearing 32, and through the spindle sleeve 29 increases the preload on the front bearing 31. Conversely, when the pressure in the chamber 95a is increased, the piston 94a forces the bearing race 84 and piston 94b to the right, decreasing the preload on the bearings 32, 31. In order to maintain a good fluid seal between the pistons 94a, 94b and the respective cylinders 90a, 90b, seals 98 are provided on opposite sides of each piston.

It can be seen that maximum and minimum preload on the bearings 31, 32 can be accurately selected by controlling the amount of movement of the pistons 94a, 94b within their cylinders. In the illustrated embodiment, the plates 91a, 91b form the ends of the cylinders 90a, 90b and serve as positive stop means for limiting movement of the pistons. The amount of piston movement is determined by the cumulative longitudinal clearances between the pistons 94a, 94b and the outer race 84 within the cylinders. Desirably, the amount of piston movement may be very small, on the order of about ten-thousandths of an inch. For example, to establish the minimum preload on the bearings, the spacer 35 may be accurately ground so that the spindle sleeve experiences a longitudinal play of 0.0006 inches to 0.001 inch under 500 pounds axial loading when the piston 94b is at its extreme right position, as seen in FIG. 2, with the outer race 84 in abutting engagement. To establish a high-preload setting, the end of the piston 94a may be ground to provide an axial clearance of 0.005 when the piston 94b is at its extreme right position with the outer race abutting. This 0.005 inch clearance will allow zero play of the spindle sleeve under 500 pounds axial loading in either direction of load application.

Since the plates 91a, 91b limit the movement of the pistons and thereby establish the maximum and minimum amount of preload on the spindle bearings, the amount of fluid pressure applied to the pistons can be sufficiently great to ensure complete movement of the pistons in the desired direction. It has been found that in a machine of the type illustrated in which the spindle may have an operating speed in the range of 30 to 2,400 r.p.m. it is desirable that the high-preload be applied in the lower speed range of 30 to about 975 r.p.m. to provide a sufficiently firm support for the spindle. The lower preload may be applied when the spindle is operated in its high range of speed, for example, between 975 and 2,400 r.p.m., so that heat generated from the pistons is kept to a minimum. It will be appreciated that pressure in the chambers 95a, 95b may be automatically changed in response to a change of spindle speed above or below the determined value, for example, 975 r.p.m., in a manner such as disclosed in U.S. Pat. No. 3,211,060 issued on the application of Walter L. McCann.

In keeping with the invention, means are provided for more efficiently cooling the spindle bearings and enabling more accurate spindle support. In this regard, the outer race of each bearing 31, 32 is formed with a plurality of grooves 100, 101, respectively, which extend circumferentially about the outer periphery of the bearings and through which a refrigerated cooling fluid is circulated. To cool the front bearing 31, a cooling fluid may pumped into the grooves 100 from a passage 102 through the headstock housing 33. The fluid passes through he grooves around the bearing and drains from the headstock housing through a passage, not shown, to a conventional heat exchange unit in the lower part of the headstock where it is cooled and then recirculated by a suitable motor driven pump. Cooling fluid similarly may be directed to the grooves 101 of the rear bearing 32 and drained to the same refrigerating unit through appropriate headstock housing passages, not shown. It will be seen that since the grooves 100, 101 are formed integrally in the outer races of the bearings the rate of heat transfer from the bearing to the cooling fluid is maximized by the increased cooling surfaces provided. In addition, the cooling grooves enable the outer periphery of the bearing to be cooled without containing the bearing in a separate heat exchange sleeve, thus enabling the bearings to be mounted in direct metal-to-metal contact with the headstock housing 33 for more accurate bearing support.

The spindle bearings 31, 32 in the illustrated embodiment also are lubricated and cooled by oil that is forced between the races and into contact with the bearing rollers. To lubricate the front bearing 31, a ring 105 formed with an annular groove 106 is disposed immediately adjacent the bearing. The oil may be forced around the ring 105 through the groove 106 and into the bearing through a plurality of passages 108. A return passage 109 defined in the housing 33 exhausts the oil from the front bearing. A labyrinth seal 110 prevents oil leakage out of the headstock 20. The rear bearing 32 similarly is lubricated through passages 112 formed in the plate 91b supplied from an oil line 114. In this case, oil is exhausted through small passages 115 in the opposite plate 91a. Drainage of lubricating oil away from the bearing 32 is further implemented by a plurality of cross-slots 118 in the inner end of the piston 94a connecting the bearing interior with an annular collector recess 119. A drainage passage 120 conducts spent lubricating oil from the recess 119 back to the reservoir. Buildup of lubricating oil in the bearing is thereby completely eliminated by the last mentioned drainage system. The same heat exchange unit and pump may be used in directing fluid both the bearing groove 100, 101 and the rollers 78, 85.

In view of the foregoing, it will be seen that the spindle mounting of the present invention has a simple and compact construction and is adapted to preload the spindle bearings at predetermined high or low adjustments. Since the relatively narrow opposed annular pistons do not extend substantially beyond the outer periphery of the bearing, the spindle mounting is particularly well suited for use when headstock space is at a premium, such as when the machine includes a live spindle. In addition, the mounting provides a more accurate spindle support due to direct mounting of the spindle bearings in the headstock housing without containment in an intermediate cooling sleeve and as a result of the improved means for dissipating bearing heat generated during high-speed operations.

I claim as my invention:

1. A spindle mounting for a machine tool comprising, in combination,
   a. a headstock housing,
   b. a spindle assembly,
   c. a pair of front and rear antifriction bearings rotatably journaling said spindle assembly within said housing,
   d. each of said bearing having an inner race secured to said spindle assembly for rotation therewith, and a
   e. nonrotatable outer race supported within said housing with a plurality of roller elements interposed between said races,
   f. one of said outer bearing races being axially movable relative to said housing and having front and rear faces,
   g. said housing defining annular cylinders on opposite sides of said movable bearing race,
   h. an axially slidable piston disposed in each said cylinder,
   i. said pistons being in substantial axial alignment on opposite sides of said outer bearing race and each being in abutting engagement with one of said faces so that the preload on said bearing is varied in response to axial movement of said pistons,
   j. a pressure chamber adjacent an outer axial end of each said piston, k. means for selectively admitting pressure to said chambers to effect movement of said pistons and outer bearing race in opposite directions, l. and positive stop means within said housing for limiting axial movement of said pistons in each direction to establish minimum and maximum preload on said bearing under operating conditions.

2. The spindle mounting of claim 1 in which said pistons do not extend radially outward substantially beyond the outer bearing race they engage.

3. The spindle mounting of claim 2 in which said pistons are annular ring shaped having a cross-sectional radial thickness substantially less than the radial cross-sectional thickness of said bearings.

4. The spindle mounting of claim 2 in which said spindle assembly includes,
   a. a spindle sleeve, and
   b. an axially extensible spindle supported within said sleeve.

5. The spindle mounting of claim 1 in which the outer bearing race of said rear bearing is axially movable,
   a. said front bearing outer race being restrained against axial movement relative to said housing, and
   b. said preload on said rear bearing being transmitted through said spindle sleeve and said inner bearing races to simultaneously vary the preload on said front bearing.

6. The spindle mounting of claim 1 in which the outer periphery of each outer bearing race is formed with a plurality of grooves extending circumferentially about the outer surface, and
   including means for transmitting a coolant to said grooves to dissipate heat generated by said bearings during rotation of said spindle.

7. The spindle mounting of claim 6 in which said outer bearing races are in direct contact and bearing engagement with said headstock housing.

8. The spindle mounting of claim 1 in which said cylinders are formed by said housing and a pair of opposed plates fixed to said housing, said plates forming said positive stop means at the outer ends of said cylinders.

* * * * *